Patented Mar. 25, 1952

2,590,176

UNITED STATES PATENT OFFICE 2,590,176

TERTIARY ALCOHOLS

Edwin George Edward Hawkins, Lower Kingswood, Tadworth, and Francis Edward Salt, Banstead, England, assignors to The Distillers Company Limited, Edinburgh, Scotland, a British company No Drawing. Application November 8, 1949, Serial No. 126,256. In Great Britain November 16, 1948

16 Claims. (Cl. 260—617)

The present invention relates to the manufacture of carbinols, in particular to carbinols where the OH group is linked to a tertiary carbon atom.

The production of mixtures of compounds containing carbinols from organic peroxides is already known. In such cases, however, difficulties often arise where it is desired to isolate the carbinols.

It is an object of the present invention to provide a process for the production of tertiary alcohols from peroxide compounds which renders it possible to recover the carbinol substantially free from other compounds and in good yields.

According to the invention the process for the production of tertiary alcohols comprises heating a hydroperoxide of a compound in which the hydroperoxide group is linked to a tertiary carbon atom, with an amine compound.

It has been found that hydroperoxides of compounds wherein the —O—OH group is linked to a tertiary carbon atom, may be converted into the corresponding carbinol by reaction with amine compounds of the general formula

where R and R₁ are alkyl, cycloalkyl, substituted alkyl, aryl or aralkyl groups or the methylene groups adjacent to the nitrogen atom of cyclic nitrogen compounds such as piperidine and piperazine, and R₁ in addition, may be hydrogen, and R₂ stands for hydrogen or an alkyl, cycloalkyl, substituted alkyl, aryl, aralkyl or acyl group. The reaction proceeds, apart from the production of the respective carbinol with the formation of water whereby the oxygen originates from the hydroperoxide group whilst the hydrogen is supplied apparently by the amine through more or less complete decomposition according to the general formula:—

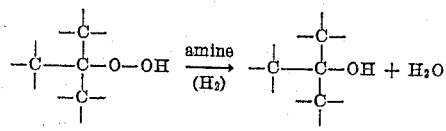

Suitable amine compounds for carrying out the process according to the invention are, for instance, the mono-, di- and tri-methyl, ethyl-, propyl-, isopropyl- and butyl-amines, aniline, mono- and di-methyl- and ethyl-aniline, mono- and di-ethyl-toluidine, mono-, di- and tri-ethanolamine, di-methyl formamide, di-ethyl formamide, piperidine, piperazine, hexamine and ethylene diamine.

The quantity of the amine compound necessary to achieve the desired result and convert the hydroperoxide into the carbinol may vary within very wide limits. In a suitable solvent, which allows the solution to be heated to the required reaction temperature, a very small amount of the amine compound was found to be sufficient. On the other hand, in other cases, the amine compound itself may serve as solvent. It was observed, however, that the smaller the amount of the amine compound used relative to the hydroperoxide, the longer it takes for the reaction to be substantially complete and the greater the tendency to thermal degradation with the formation of undesired products such as ketones or unsaturated compounds.

The temperature most suitable for the reaction to proceed smoothly ranges between about 50° and 150° C., a temperature of from about 130 to 150° C. being necessary with amines such as aniline and toluidine which react less readily whilst with the majority of the amines a temperature of from 110° to 125° C. is sufficient. The time required for the reaction to be substantially complete also depends as already stated within certain limits, upon the ratio of the amount of amine to that of the hydroperoxide used. When the amount of amine used is greater than that of the hydroperoxide, it was found that the reaction was almost complete within a short time, sometimes within 15 minutes, or even less, whilst with mixtures wherein the amount of the hydroperoxide predominated, heating for several hours may be necessary to achieve substantially complete conversion. Suitable reaction temperatures and times required for the reaction may be ascertained by a few simple tests.

Suitable hydroperoxides for use in the process of the invention are, for instance, the hydroperoxide of isopropyl benzene, the mono- and di-hydroperoxides of diisopropyl benzene, the hydroperoxide of methyl cyclohexane, the hydroperoxide of methyl cyclopentane, the hydroperoxides of alpha and beta isopropyl naphthalene, tertiary butyl hydroperoxide and the like.

When the hydroperoxides are subjected to the action of small amounts of the amine compounds and where the latter compounds do not themselves serve as solvent, the initial hydrocarbon compounds from which the hydroperoxides are derived may be used as solvent or diluent. For example, in the case of isopropyl benzene hydroperoxide, isopropyl benzene; in the case of isopropyl naphthalene hydroperoxide, isopropyl naphthalene; in the case of methyl cyclopentane hydroperoxide, methyl cyclopentane may be used.

The reaction generally proceeds with the evolution of heat. It is, therefore, advantageous to provide for efficient means for controlling the reaction temperature.

The carbinols produced by the reaction may be recovered by suitable methods such as fractional distillation and thereby separated from the solvent or from the amine compound which has served simultaneously as solvent and catalyst or from both. In most cases a considerable proportion of the original amine compound may also be recovered as such, for example, by extraction with aqueous acid or fractional distillation. The resulting carbinol is substantially free from ketones and unsaturated compounds except in cases—see for instance Example 3 below—in which prolonged heating has been necessary.

The following examples illustrate the manner in which the process of the invention may be carried out in practice. The parts indicated are parts by weight.

Example 1

20 parts of isopropyl benzene hydroperoxide and 50 parts of triethylamine were heated at 110 to 120° C. After 10 minutes 90% of the hydroperoxide had decomposed and the reaction was complete within ½ hour. The reaction mixture was distilled and yielded at 17 mm. pressure a fraction which boiled at 90 to 94° C. and contained 16.3 parts of phenyl di-methyl carbinol.

Example 2

10 parts of isopropyl benzene hydroperoxide and 25 parts of triethylamine were heated to a bath temperature of 60 to 70° C. Heating was continued until all the hydroperoxide had reacted. The product was distilled and yielded 9 parts of the carbinol fraction.

Example 3

10 parts of isopropyl benzene hydroperoxide in 32 parts of isopropyl benzene and 2 parts of triethylamine were heated at 100 to 120° C. for 8½ hours, after which time the peroxide had disappeared. The reaction product was fractionated and yielded a fraction containing 81.5% of the carbinol. Due to the more severe heat treatment the fraction also contained 13% acetophenone.

Example 4

10 parts of isopropyl benzene hydroperoxide and 20.5 parts of dimethyl aniline were heated to 110 to 120° C. The reaction was complete after ½ hour and the reaction product was fractionated and yielded 27 parts consisting mainly of the amine and the carbinol. The distillate was taken up in ether and washed with aqueous hydrochloric acid. The ethereal solution was then dried and the ether removed by distillation, yielding a residue containing 7.7 parts of the carbinol.

Example 5

10 parts of isopropyl benzene hydroperoxide and 25 parts of diethylamine were heated in a bath to 100° C., the temperature in the reaction mixture being 63° C. After 5 hours half of the hydroperoxide had decomposed and the decomposition was complete after a further 6 to 7 hours. The reaction mixture was distilled and furnished:

| | Parts |
|---|---|
| Fraction 1, 52–58° C./atmos | 19.5 |
| Fraction 2, 58–95° C./atmos | 0.9 |
| Fraction 3, 80–92° C./15 mm | 9.8 |

The first fraction was unchanged amine and the last fraction was mainly the carbinol.

Example 6

10 parts of isopropyl benzene hydroperoxide and 25 parts of n-butylamine were heated together at 100 to 110° C. for 9½ hours, when the peroxide was completely decomposed. The product was distilled and yielded:

| | Parts |
|---|---|
| Fraction 1, 78–80° C./atmos | 18.0 |
| Fraction 2, 85–88° C./atmos | 1.5 |
| Fraction 3, 88–92° C./15 mm | 10.0 |

Fraction 3 was mainly the carbinol.

Example 7

5 parts of isopropyl benzene hydroperoxide in 12 parts of isopropyl benzene were heated with 12 parts of hexamine for ½ hour at 110 to 120° C. After this time most of the peroxide had decomposed. After a further heating for a short time, the decomposition was completed to give the carbinol.

Example 8

20 parts of isopropyl benzene hydroperoxide were heated with 50 parts of tri-ethanolamine to 110 to 120° C. The peroxide had decomposed within ½ hour. Distillation provided 15.9 parts of a fraction boiling from 90 to 92° C./20 mm., and consisting of the carbinol.

Example 9

10 parts of isopropyl benzene hydroperoxide and 25 parts of commercial di-ethanolamine were heated to 110 to 120° C. After ½ hour the reaction mixture provided on distillation 8.5 parts of the carbinol.

Example 10

5 parts of isopropyl benzene hydroperoxide and 12 parts of dimethyl formamide were heated at a bath temperature of 100 to 120° C. After ½ hour about 80 to 90% of the peroxide had decomposed and within a further two hours the peroxide had almost completely disappeared. The product was subjected to fractional distillation in order to separate the carbinol.

Example 11

10 parts of isopropyl benzene hydroperoxide and 25 parts of piperidine were heated for ½ hour at a bath temperature of 110 to 120° C. The peroxide had all decomposed and the product was distilled. The carbinol fraction was washed with hydrochloric acid to remove all traces of piperidine and 9 parts of the carbinol were obtained.

Example 12

2.5 parts of piperazine, 6 parts of isopropyl benzene and 16 parts of isopropyl benzene hydroperoxide were heated for ½ hour as in Example 11. The carbinol was again produced in good yield.

Example 13

8 parts of di-isopropyl benzene monohydroperoxide were heated with 20 parts of triethylamine at 110 to 120° C. for ½ hour. After that time a trace of undecomposed hydroperoxide still remained. The heating was, therefore, continued for a further ½ hour. The product was then distilled. After distilling off the amine, the main product (7.0 parts) boiled at 130 to 132° C./21 mm. It was slightly yellow and crystallised completely on standing. On recrystallising from petrol a product with a melting point of 37 to 38° C. was obtained, which yielded on recrystallisation from a mixture of ethanol and water and then petrol, mats of needles with a melting point 42.5 to 43° C. This proved to be a dimethyl (isopropyl phenyl) carbinol.

*Example 14*

8 parts of di-isopropyl benzene di-hydroperoxide and 20 parts of trimethylamine were heated at 110 to 120° C. for ¾ hour. The product gave on distillation 4.5 parts of a fraction boiling between 128 and 160° C./15 mm., which crystallised on standing. When this fraction was recrystallised from benzene it had a melting point of 141 to 142° C., and consisted of bis-(2-hydroxy propyl-2)-benzene.

*Example 15*

10 parts of methyl cyclopentane hydroperoxide were heated with 20 parts of triethanolamine at 110° to 120° C. for 1 hour. By fractional distillation of the reaction mixture 6.0 parts of the corresponding carbinol were obtained.

We claim:

1. Process for the production of tertiary alcohols which comprises reacting in liquid phase at elevated temperatures a hydroperoxide compound in which the hydroperoxide group is linked to a tertiary carbon atom, with an amine compound of the general formula

wherein R is a substituent selected from the group consisting of the alkyl, cyclo-alkyl, substituted alkyl, aryl, aralkyl radicals and the methylene groups adjacent to the nitrogen atom of cyclic nitrogen compounds, $R_1$ is a substituent selected from the group consisting of hydrogen, the alkyl, cyclo-alkyl, substituted alkyl, aryl, aralkyl radicals and the methylene groups adjacent to the nitrogen atom of cyclic nitrogen compounds, and $R_2$ is a substituent selected from the group consisting of hydrogen, an alkyl, cyclo alkyl, substituted alkyl, aryl, aralkyl or acyl group.

2. Process as claimed in claim 1 wherein the temperature is between 50° and 150° C.

3. Process as claimed in claim 1 wherein the reaction is effected in the presence of a solvent for both reacting compounds.

4. Process as claimed in claim 3 wherein the reaction is effected in the presence as solvent of the initial hydrocarbon from which the hydroperoxide compound is derived.

5. Process for the production of tertiary alcohols which comprises reacting at elevated temperatures a hydroperoxide compound in which the hydroperoxide group is linked to a tertiary carbon atom with an amine compound using said amine compound in such an amount that the hydroperoxide compound is dissolved therein.

6. A process in accordance with claim 1 in which the hydroperoxide is an alkyl benzene hydroperoxide.

7. A process in accordance with claim 1 in which the hydroperoxide is isopropyl benzene hydroperoxide.

8. A process in accordance with claim 1 in which the hydroperoxide is di-isopropyl benzene mono-hydroperoxide.

9. A process in accordance with claim 1 in which the hydroperoxide is di-isopropyl benzene di-hydroperoxide.

10. A process in accordance with claim 1 in which the hydroperoxide is methyl-cyclo-pentane-hydroperoxide.

11. A process in accordance with claim 1 in which the amine is a polyalkyl amine.

12. A process in accordance with claim 1 in which the amine is triethyl amine.

13. A process in accordance with claim 1 in which the amine is tri-methylamine.

14. A process in accordance with claim 1 in which the amine is di-methylaniline.

15. A process in accordance with claim 1 in which the amine is di-ethyl-aniline.

16. A process in accordance with claim 1 in which the amine is hexamine.

EDWIN GEORGE EDWARD HAWKINS.
FRANCIS EDWARD SALT.

REFERENCES CITED

The following references are of record in the file of this patent:

UNITED STATES PATENTS

| Number | Name | Date |
|---|---|---|
| 2,484,841 | Lorand | Oct. 18, 1949 |
| 2,497,349 | Farkas et al. | Feb. 14, 1950 |

OTHER REFERENCES

Farmer et al.: J. Chem. Soc. (London), page 121 (1942).

Hock et al.: Ber. Deut. Chem., vol. 71, page 1430 (1938).